United States Patent
Billiani et al.

(10) Patent No.: US 9,873,756 B2
(45) Date of Patent: Jan. 23, 2018

(54) MODIFIED WATER-BORNE ALKYD RESIN

(71) Applicant: ALLNEX AUSTRIA GmbH, Werndorf (AT)

(72) Inventors: Johann Billiani, Graz (AT); Robert Potzmann, Buizingen (BE); Michael Gobec, Graz (AT); Wolfgang Hyden, Voitsberg (AT); Johannes Scherz, Wundschuh (AT); Jörg Wango, Wundschuh (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 0 days.

(21) Appl. No.: 15/036,844

(22) PCT Filed: Dec. 24, 2014

(86) PCT No.: PCT/EP2014/079336
§ 371 (c)(1),
(2) Date: May 16, 2016

(87) PCT Pub. No.: WO2015/101585
PCT Pub. Date: Jul. 9, 2015

(65) Prior Publication Data
US 2016/0297914 A1 Oct. 13, 2016

(30) Foreign Application Priority Data
Dec. 31, 2013 (EP) ..................... 13199923

(51) Int. Cl.
C09D 5/16 (2006.01)
C08G 61/02 (2006.01)
C08G 61/04 (2006.01)
C08F 283/01 (2006.01)
C09D 151/08 (2006.01)
C09D 167/08 (2006.01)

(52) U.S. Cl.
CPC .......... C08F 283/01 (2013.01); C09D 151/08 (2013.01); C09D 167/08 (2013.01)

(58) Field of Classification Search
CPC ... C08F 283/01; C09D 151/08; C09D 167/08; C08L 33/08; C08L 25/14
USPC ........................ 523/122, 1; 520/1
See application file for complete search history.

(56) References Cited

U.S. PATENT DOCUMENTS

| | | | | |
|---|---|---|---|---|
| 3,979,346 A | * | 9/1976 | Zuckert | ............... C08J 3/05 106/252 |
| 4,451,596 A | * | 5/1984 | Wilk | .............. C08F 283/02 523/501 |
| 5,538,760 A | | 7/1996 | Sharma | |
| 5,698,625 A | | 12/1997 | Billiani et al. | |
| 6,166,150 A | | 12/2000 | Wilke et al. | |
| 2006/0178498 A1 | | 8/2006 | Billiani et al. | |
| 2010/0197851 A1 | * | 8/2010 | Breiner | ............... C09D 133/08 524/507 |

OTHER PUBLICATIONS

International Search Report dated Mar. 4, 2015 in International Application No. PCT/EP2014/079336.

* cited by examiner

Primary Examiner — Jessica Whiteley
(74) Attorney, Agent, or Firm — Wenderoth, Lind & Ponack, L.L.P.

(57) ABSTRACT

The invention relates to an aqueous dispersion of a modified alkyd resin comprising water, an emulsifier S a copolymer P having moieties derived from one or more of esters M1 of an olefinically unsaturated carboxylic acid M11 having at least one olefinic unsaturation and at least one acid group per molecule, with a linear, branched or cyclic aliphatic hydroxy-functional compound M12 having at least one hydroxyl group per molecule, esters M2 of an olefinically unsaturated hydroxy functional compound M22 having at least one olefinic unsaturation and at least one hydroxyl group per molecule, with linear, branched or cyclic aliphatic carboxylic acid M21 having no olefinic unsaturation and at least one acid group per molecule, an olefinically unsaturated carboxylic acid M11 having at least one olefinic unsaturation and at least one acid group per molecule, an olefinically unsaturated hydroxy functional compound M22 having at least one olefinic unsaturation and at least one hydroxyl group per molecule, an olefinically unsaturated compound M3 that has at least one olefinic unsaturation, selected from the group consisting of olefinically unsaturated alkylaromatic compounds M31, olefinically unsaturated aliphatic ethers M32, olefinically unsaturated aliphatic ketones M33, olefinically unsaturated aliphatic halogenides M34, and olefinically unsaturated aliphatic pseudohalogenides M35, an alkyd resin A based on aliphatic linear or branched monocarboxylic acids A1 having from six to forty carbon atoms, aliphatic linear or branched or cyclic hydroxy-functional compounds A2 having at least two hydroxyl groups per molecule, aromatic or aliphatic linear, branched or cyclic acids A3 having at least two acid groups per molecule, wherein the alkyd resin A has an acid number of at least 3 mg/g, and wherein the ratio m(A)/m(P) of the mass m(A) of the alkyd resin A to the mass m(P) of the polymer P is at least 1 kg/0.5 kg, a method for their preparation, and a method of use thereof.

9 Claims, No Drawings

MODIFIED WATER-BORNE ALKYD RESIN

FIELD OF THE INVENTION

The present invention relates to a modified water-borne alkyd resin, to a process for its preparation, and to a method of use thereof.

BACKGROUND OF THE INVENTION

Modified water-borne alkyd resins have been described in EP 0 758 365 B1. In this document, high gloss topcoats are disclosed that are made in a two-step reaction, the first step being a radically initiated copolymerisation of unsaturated fatty acids, meth(acrylate) monomers having polyoxyalkylene groups, and methacrylic acid in mixture with further olefinically unsaturated monomers, and the second step being a condensation reaction of the modified fatty acids together with further (unmodified) unsaturated fatty acids, multifunctional alcohols having from two to six hydroxyl groups, aromatic and/or aliphatic dicarboxylic acids, and optionally, cyclic or polycyclic carboxylic acids. The mandatory use of meth(acrylate) monomers having polyoxyalkylene groups as comonomers does away with the need to add solvents to achieve high gloss, but may impair the water and humidity resistance due to the hydrophilic properties of these comonomers.

Further modified alkyd resins have been described in DE 31 32 937 A1. These modified alkyd resins are made from a water-dilutable alkyd resin dispersion having an acid number of from 5 mg/g to 40 mg/g, a hydroxyl number of from 150 mg/g to 300 mg/g, and a mass fraction of solids of from 30% to 90%. Acrylic and methacrylic monomers including also acid functional and hydroxy-functional monomers together with radical initiators and chain transfer agents are added to the heated dispersion, and the mixture is subjected to polymerisation. Crosslinking is effected by addition of etherified melamine formaldehyde resins.

Other modified water-borne alkyd resins have been described, i.a., in U.S. Pat. No. 5,538,760 A. In the process described therein, an alkyd resin is dissolved in one or more monoethylenically unsaturated monomers to form a mixture, the said alkyd resin being prepared in a separate step from a saturated fatty acid having from six to twenty-four carbon atoms, a diol component selected from the group consisting of cycloaliphatic diols having from six to twenty carbon atoms and aliphatic diols having from three to twenty carbon atoms, a dicarboxylic acid selected from the group consisting of aromatic dicarboxylic acids having eight to fourteen carbon atoms, aliphatic dicarboxylic acids having from four to twelve carbon atoms, and cycloaliphatic dicarboxylic acids having from eight to twelve carbon atoms, and the mixture is dispersed in water in the presence of a surfactant to form an emulsion which is subsequently heated upon addition of a radical initiator to effect a polymerisation reaction leading to formation of a latex. The mass fraction of the alkyd resin in the aqueous emulsion before polymerisation in the examples fall into a range of from 0.131 kg/kg (example 5) to 0.264 kg/kg (Example 16). Higher mass fractions have not been described, nor exemplified. The acid numbers of the alkyd resins used range from 1.47 mg/g (alkyd resin A) to 3.12 mg/g (alkyd resin E). No higher acid numbers have been described or reported in the examples. The mass ratio of alkyd resin to ethylenically unsaturated monomers is between 1:0.66 (example 16) to 1:2.3 (examples 4 and 5). Higher mass ratios are reported to form no stable latices (examples 2 and 3).

The latices described are used for cleaning hard surfaces such as concrete, tiles, wood, formica, metal, glass, or ceramic, and to provide them with a protective shine.

It has been found in the experiments underlying the present invention that the low ratio of the mass of alkyd resin and the mass of polymer derived from the ethylenically unsaturated monomers limits the gloss of such coating made from latices have these two constituents in a unfavourable way.

It was therefore an object of this invention to provide an alkyd resin system with a high mass fraction of solids that forms a stable aqueous emulsion, that can be made by external emulsification from an alkyd resin that is dispersible in water with a higher mass fraction of solids, and that provides a fast drying coating with high gloss surfaces.

SUMMARY OF THE INVENTION

It was found that an emulsion polymer of olefinically unsaturated monomers which are polymerised in the presence of specific alkyd resins leads to an aqueous dispersion of modified alkyd resins having the desired properties. Moreover, it has been found, unexpectedly, that the waterborne modified alkyd resins according to the invention have an improved gloss and gloss retention compared to currently existing modified water-borne alkyd resins based on alkyd-acryl combinations and modifications.

An object of this invention is therefore an aqueous dispersion of a modified alkyd resin comprising
water,
an emulsifier S
a polymer P having moieties derived from two or more of
esters M1 of an olefinically unsaturated carboxylic acid M11 having at least one olefinic unsaturation and at least one acid group per molecule, with a linear, branched or cyclic aliphatic hydroxy-functional compound M12 having at least one hydroxyl group per molecule,
esters M2 of an olefinically unsaturated hydroxy functional compound M22 having at least one olefinic unsaturation and at least one hydroxyl group per molecule, with linear, branched or cyclic aliphatic carboxylic acid M21 having no olefinic unsaturation and at least one acid group per molecule,
an olefinically unsaturated carboxylic acid M11 having at least one olefinic unsaturation and at least one acid group per molecule,
an olefinically unsaturated hydroxy functional compound M22 having at least one olefinic unsaturation and at least one hydroxyl group per molecule,
an olefinically unsaturated compound M3 that has at least one olefinic unsaturation selected from the group consisting of olefinically unsaturated alkylaromatic compounds M31, olefinically unsaturated aliphatic ethers M32, olefinically unsaturated aliphatic ketones M33, olefinically unsaturated aliphatic halogenides M34, and olefinically
an alkyd resin A based on aliphatic linear or branched monocarboxylic acids A1 having from six to forty carbon atoms, aliphatic linear or branched or cyclic hydroxy-functional compounds A2 having at least two hydroxyl groups per molecule, aromatic or aliphatic linear, branched or cyclic acids A3 having at least two acid groups per molecule, wherein the alkyd resin A has an acid number of at least 3 mg/g, wherein the ratio m(A)/m(P) of the mass m(A) of the alkyd resin A to the mass m(P) of the polymer P is at least 1 kg/0.5 kg.

DETAILED DESCRIPTION OF THE PREFERRED EMBODIMENTS

The emulsifier S is preferably a mixture of a nonionic emulsifier $S_n$ and an anionic emulsifier $S_a$.

The anionic emulsifier $S_a$ are be selected from the group consisting of carboxylates, organic sulphonates, organic sulphates, and phosphorus-derived acid salts.

Among the carboxylates, mention is made of the so-called soaps which are salts of alkali metals or of organic ammonium compounds with fatty acids, of alkoxycarboxylates, of sarkosides, of sulphonamide-carboxylates, of lactylates, of alkylmalonic and alkylsuccinic acid salts, of salts of disproportionated resinous acids such as abietic acid, and of naphthenates.

Among the sulphonates, mention is made of alkylsulphonates such as the so-called mersolates, of fatty acid sulphonates, of sulphonated esters, of sulphonated fatty acid esters, of sarkosides, of taurides, of sulphosuccinic esters, of alkylbenzene sulphonates, and of alkylnaphthalene sulphonates.

Among the sulphates, mention is made of sulphated primary and secondary aliphatic alcohols, of sulphated fats and oils, and of sulphated polyglycol ethers.

Among the phosphorus-derived organic acid derivatives, mention is made of phosphoric acid esters of aliphatic long-chain alcohols, alkylphenols, and alkoxylated, particularly ethoxylated, aliphatic long chain alcohols or phenols, and of analogous phosphonates and phosphinates. Inorganic phosphates such as trisodium phosphate, tetrasodium diphosphate, and sodium tripolyphosphate can also be used.

The nonionic emulsifier $S_n$ has preferably moieties in its molecule that are derived from a sequence of oxyethylene groups such as those formed by ethoxylation of aliphatic alcohols, particularly fatty alcohols. Other useful nonionic emulsifiers are ethoxylation products of alkylphenols, fatty acids, fatty amines, and polypropylene glycols, as well as propoxylation products of polyethylene glycols.

Preferred nonionic emulsifiers $S_n$ are branched primary alcohol alkoxylates of the formula (I):

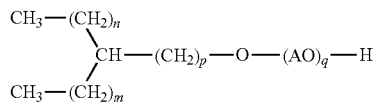

where n and m are each independently from 1 to 13; and p is 1 or 2; such that n+m+p is preferably from 5 to 15; AO is an alkylene oxide residue having from 2 to 4 carbon atoms; and q is from 5 to 50.

The alkylene oxide groups AO are desirably ethylene oxide and/or propylene oxide residues. Preferably, all the residues are ethylene oxide residues although mixtures of ethylene oxide and propylene oxide residues, particularly preferably with a molar ratio of ethylene oxide to propylene oxide residues from 1:5 to 10:1, can be used. When mixed alkylene oxide residues are used, the polyoxyalkylene chain can be a random or a block copolymeric chain. Within the range of from 5 to 50, q is preferably from 10 to 30. The number of oxyalkylene units in the polyoxyalkylene chain, q, is an average value and may be non-integral. The alkoxylates of the formula (I) can be used alone or preferably, in combination with similar alkoxylates of linear primary alcohols, containing similar numbers of carbon atoms. The mass fraction of branched alkoxylate of the formula (I) in the mixture with alkoxylates of linear primary alcohols is preferably at least 30% and more preferred at least 40%. In a preferred embodiment, alkoxylation of the alcohols as mentioned in formula I supra is made in a way that the final alkylene oxide groups are derived from propylene oxide, i.e., the final structure is

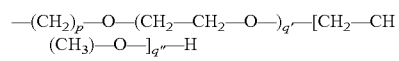

where q'+q"=q, and q" is preferably smaller than q', and is preferably from one to three. Alkoxylated alcohols obeying this condition have been found to have a reduced propensity to foaming.

Further preferred nonionic emulsifiers are copolymers of ethylene oxide and propylene oxide, particularly block copolymers, or still more preferred, triblock copolymers. They have preferably a structure which includes terminal polyoxypropylene blocks of preferably at least two consecutive oxypropylene units which structure gives less propensity to foaming.

In a preferred embodiment, the ratio $m_{Sa}/m_{Sn}$ of the mass $m_{sa}$ of anionic emulsifier to the mass $m_{Sn}$ of non-ionic emulsifier is from 75:25 to 25:75, more preferred, from 71:29 to 29:71. These preferred ratios can be used with the general choice of the other individual components used in making the modified alkyd resins of the present invention, or their quantities, and also, with any preferred choice for any one, or more than one component, their quantity, or any process condition.

The amount of emulsifiers is preferably chosen to provide a mass fraction $w_s$ of emulsifiers in the sum of the mass $m_A$ of the alkyd resin, the mass $m_P$ of the polymer and the mass $m_S$ of the emulsifier, calculated as $w_S=m_S/(m_A+m_P+m_S)$ of from 3% to 10%, particularly preferably from 4% to 9%. Lower mass fractions of emulsifiers result in unstable dispersions, and require frequently more efficient dispersing equipment such as high speed mixers. Too high mass fractions of emulsifiers can impair the stability of the coating film, and may lead to foaming of the dispersions prepared therewith.

The polymer P is a copolymer of at least two of the monomers M1, M2, M11, M22, and M3. In a preferred embodiment, at least one of the monomers used in the copolymer belongs to the group M3. In a further preferred embodiment, the mixture of monomers is chosen in a way that the glass transition temperature of the polymer is between 30° C. and 120° C., particularly preferred between 45° C. and 80° C. It is further preferred that both these conditions are fulfilled in the polymer.

The monomers M1 are esters of an olefinically unsaturated carboxylic acid M11 having at least one olefinic unsaturation and at least one acid group per molecule, with a linear, branched or cyclic aliphatic hydroxy-functional compound M12 having at least one hydroxyl group per molecule.

The olefinically unsaturated carboxylic acids M11 have preferably from three to eight carbon atoms, and are preferably selected from the group consisting of the monocarboxylic acids acrylic acid, methacrylic acid, ethacrylic acid, crotonic acid, isocrotonic acid, and vinylacetic acid, and from the dicarboxylic acids maleic acid, fumaric acid, itaconic acid, citraconic acid, and mesaconic acid. Particularly preferred are acrylic acid and methacrylic acid.

The linear, branched or cyclic aliphatic hydroxy-functional compounds M12 preferably have from one to twenty carbon atoms and are preferably selected from the group consisting of monohydric alcohols such as methanol, ethanol, n-propanol, iso-propanol, n-butanol, iso-butanol, sec.-butanol, tert.-butanol, 1-hexanol, 2-ethylhexanol-1,1-decanol, 1-tridecanol, and 1-octadecanol, and also dihydric alcohols such as glycol, 1,2-propanediol, 1,3-propanediol, 1,4-butanediol, cyclohexane-1,4-diol, cyclohexane-1,2-dimethanol, cyclohexane-1,4-dimethanol, and tricyclodecane-dimethanol.

The monomers M2 are esters of an olefinically unsaturated hydroxy functional compound M22 having at least one olefinic unsaturation and at least one hydroxyl group per molecule, with linear, branched or cyclic aliphatic carboxylic acid M21 having no olefinic unsaturation and at least one acid group per molecule.

The linear, branched or cyclic aliphatic carboxylic acids M21 have from one to twenty carbon atoms and at least one carboxylic acid group, and are preferably selected from the group consisting of acetic acid, 2-ethylhexanoic acid, 2,2-dimethylpropanoic acid, 2,2-dimethyl-butanoic acid, 2,2-dimethylpentanoic acid, 2,2-dimethyloctanoic aid, and commercial mixtures of highly branched aliphatic acids known as Koch acids.

The olefinically unsaturated hydroxy functional compounds M22 have preferably from two to eight carbon atoms, and are preferably selected from the group consisting of vinyl alcohol, allyl alcohol, methallyl alcohol, ethallyl alcohol, 2-buten-1-ol, and 2-hexen-1-ol.

The olefinically unsaturated compounds M3 have preferably from two to twenty carbon atoms and are selected from the group consisting of unsaturated alkylaromatic compounds M31 that have at least one olefinic unsaturation, preferably styrene, alpha-methylstyrene, para-methyl styrene, divinyl benzene, 1-vinylnaphthalene, 2-vinylnaphthalene, olefinically unsaturated aliphatic ethers M32, preferably butylvinylether, olefinically unsaturated aliphatic ketones M33, preferably vinylmethylketone, olefinically unsaturated aliphatic halogenides M34, preferably vinyl chloride, and olefinically unsaturated aliphatic pseudohalogenides M35, preferably acrylonitrile and methacrylonitrile.

Preferred are copolymers P wherein at least one of the monomers used in the copolymer P belongs to the group M3. Also preferred are copolymers P wherein at least one of the monomers used in the copolymer P belongs to the group M1. In a further preferred embodiment, at least one each of monomers of group M1 and of group M3 are used in the copolymer P.

Particularly preferred are copolymers that contain only monomers of group M1 and of group M3. Among these, styrene copolymers where the monomers M3 comprise styrene are preferred. It is further preferred that the mass fraction of monomers M3 that form homopolymers with a glass transition temperature of at least 60° C. is at least 50% of the monomer mixture from which the copolymer P is prepared. In the context of this invention, a monomer is "used" in a copolymer if it is present in the mixture of monomers from which the copolymer P is made. The term "copolymer" as used herein refers to any polymer which has a structure derived from at least two different monomers, and thus also comprises terpolymers or quadripolymers etc.

The polymer P is preferably made by radically initiated polymerisation, in the presence of an aqueous dispersion of the alkyd resin A. In a preferred process the alkyd resin is charged to a polymerisation vessel, and heated to at least partially melt or soften the alkyd resin. The mixture of monomers is then added under stirring, optionally in the presence of a chain transfer agent, to form a solution of the alkyd resin in the monomer mixture. A small amount of water is then added together with a base, preferably an alkali hydroxide such as potassium hydroxide, to at least partially neutralise the residual acid functions in the alkyd resin. An emulsifier is then added under stirring which emulsifier is preferably a mixture of an anionic and a non-ionic emulsifier. The anionic emulsifier is preferably a sulphate or a carboxylate. As non-ionic emulsifier, it has been shown to be advantageous in the experiments underlying the present invention to use alkoxylates of aliphatic alcohols having from ten to twenty carbon atoms. Particularly good results have been obtained when a mixture of linear alcohols, such as lauryl alcohol, and a guerbet alcohol made from hexanol was alkoxylated with ethylene oxide or mixtures of ethylene oxide and propylene oxide with a mass fraction of ethylene oxide of approximately 80% to provide between fifteen and twenty-five oxyalkylene units to an alcohol molecule. Water is then added to the organic solution comprising the alkyd resin, the monomer mixture, and the emulsifiers, the amount of water being preferably chosen in a way that the ratio of the mass of alkyd resin to the mass of water added is between 100:50 and 100:200. Emulsification requires efficient mixing; for very fine dispersions, high shear equipment may be required. To this dispersion, a water-soluble radical initiator is added, and the progress of the polymerisation reaction and consumption of monomers is monitored.

The alkyd resin A is based on aliphatic linear or branched monocarboxylic acids A1 having from six to forty carbon atoms, aliphatic linear or branched or cyclic hydroxy-functional compounds A2 having at least two hydroxyl groups per molecule, aromatic or aliphatic linear, branched or cyclic acids A3 having at least two acid groups per molecule, and aromatic monoacids A4, wherein the alkyd resin A preferably has an acid number of at least 3 mg/g, and not more than 20 mg/g. The alkyd resin A has preferably a hydroxyl number of from 10 mg/g to 100 mg/g, more preferred from 20 mg/g to 90 mg/g, and particularly preferred, from 25 mg/g to 80 mg/g. It is preferred that the Staudinger index $J_g$ of the alkyd resin A, measured in chloroform as solvent at 23° C., is at least 5 cm$^3$/g, and not more than 20 cm$^3$/g. It is further preferred that the alkyd resin A itself is not water-soluble, i.e. the amount of acid groups is not sufficient, as such, or in at least partially neutralised form, to render the alkyd resin water-soluble. The preferred upper limit of 20 mg/g for the acid number of the alkyd resins A ensures this property.

The aliphatic linear or branched monocarboxylic acids A1 having from six to forty carbon atoms are preferably selected from the group consisting of caproic acid, caprylic acid, capric acid, lauric acid, myristic acid, palmitic acid, stearic acid, arachidic acid, behenic acid, lignoceric acid, lauroleic acid, myristoleic acid, palmitoleic acid, oleic acid, gadoleic acid, erucic acid, ricinoleic acid, linoleic acid, linolenic acid, eicosapentaenoic acid (timnodonic acid), and docosahexaenoic acid (cervonic acid).

The aliphatic linear or branched or cyclic hydroxy-functional compounds A2 have at least two hydroxyl groups per molecule, and from two to twenty carbon atoms. In a preferred embodiment, the compounds A2 have an average number of hydroxyl groups per molecule of at least 2.5, particularly preferred, at least 2.7, and more preferred, at least 2.9. In a further preferred embodiment, a mixture of at least two such aliphatic linear or branched or cyclic hydroxy-functional compounds is used, wherein at least one of these compounds present in this mixture, referred to as A21, has three or more hydroxyl groups per molecule.

Preferably, in the amount of substance n(OH, A2) of hydroxyl groups present in the mixture of compounds A2, a fraction of at least 40% (0.4 mol/mol) is contributed by compounds A21 having three or more hydroxyl groups per molecule. Particularly preferable, this fraction is at least 50%, and more preferable, at least 60%. In a further preferred embodiment, the fraction of hydroxyl groups contributed by dihydroxy compounds present in A2 is not more than 10%. Among the dihydroxy compounds, preferred are ethylene glycol, 1,2-propanediol, 1,3-propanediol, 1,4-butanediol, neopentylglycol, cyclohexane-1,4-diol, cyclohexane-1,2-dimethanol, cyclohexane-1,4-dimethanol, and tricyclodecane-dimethanol. Among the compounds having more than two hydroxy groups per molecule, preferred are glycerol, 1,2,4-butane triol, 1,2,6-hexane triol, 2-hydroxymethyl-1,3-propanediol, trimethylolethane, trimethylol propane, erythritol, threitol, pentaerythritol, diglycerol, ditrimethylolpropane, ditrimethylolethane, adonitol, xylitol, mannitol, and sorbitol.

The aromatic or aliphatic linear, branched or cyclic acids A3 having at least two acid groups per molecule have from two to forty carbon atoms and are preferably selected from the group consisting of succinic acid, adipic acid, dimeric fatty acids, phthalic acid, isophthalic acid, terephthalic acid, trimellithic acid, an anhydrides of these if they exist.

Aromatic monoacids A4 are used to reduce the degree of condensation, and also the functionality of the alkyd resins, preferred compounds are benzoic acid and p-tert.-butyl benzoic acid.

The alkyd resins A are preferably made in a condensation reaction in bulk or in the presence of small amounts of solvents, e.g., ketones, aliphatic hydrocarbons, or aromatic hydrocarbons such as xylene, to avoid gelation, where the starting materials or educts are mixed and heated, optionally in the presence of catalytic substances such as zinc salts, and of triphenyl phosphite to improve the colour, under splitting off of water formed in the condensation reaction. The added solvent helps in the azeotropic removal of water.

It is also preferred to use urethane modified alkyd resins A' which are prepared from alkyd resins A which have hydroxyl groups as functional groups, and which are reacted after condensation with multifunctional isocyanates to effect a chain extension by linking two or more alkyd resin units by urethane bridging groups, which improves the chemical and mechanical resistance and the hardness and elasticity.

The physical quantity formerly referred to as "limiting viscosity number", properly named "Staudinger-Index" $J_g$ according to DIN 1342, part 2.4, as it is neither a number, nor is it a viscosity, is the limiting value of the Staudinger function $J_v$ for decreasing concentration and decreasing shear gradient, wherein $J_v$ stands for the relative change in viscosity divided by the mass concentration $$\beta_B = m_B/V$$

of the solute B (having a mass $m_B$ of the solute in a volume V of the solution), viz., $$J_v = (\eta_r - 1)/\beta_B.$$

The relative change in viscosity $\eta_r - 1$ is calculated as $$\eta_r - 1 = (\eta - \eta_s)/\eta_s.$$

The relative viscosity $\eta_r$ is the ratio of the viscosity $\eta$ of the solution under consideration, and the viscosity $\eta_s$ of the pure solvent. The physical significance of the Staudinger index is that of a specific hydrodynamic volume of the solvated polymer coils at infinite dilution in the state of rest. The unit generally accepted for J is "cm$^3$/g"; formerly often "dl/g".

The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g".

The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

The ratio m(A)/m(P) of the mass m(A) of the alkyd resin A to the mass m(P) of the polymer P is at least 1 kg/0.5 kg. In a preferred embodiment, the ratio m(A)/m(P) is at least 1 kg/0.4 kg. It is particularly preferred that this ratio m(A)/m(P) is at least 1 kg/0.3 kg.

Any of the preferred embodiments, be it the choice of the individual components used or their quantities, or process conditions, or process sequences, can be combined with the general choice for the other individual components used, or their quantities, and also, combinations thereof with any one or more than one, of the other preferred embodiments.

The modified alkyd resin dispersions according to the invention are particularly useful to paint trimwork. They provide fast drying, good gloss, and particularly, good gloss retention. Coating compositions are prepared from the said dispersion by addition thereof to a pigment paste which comprises at least one pigment, and at least one additive selected from the group consisting of defoamers, wetting agents, levelling additives, biocides, and siccatives.

EXAMPLES

The invention is illustrated by the following examples which are not intended to be limiting. When "water" is mentioned in these examples, fully desalinated water is always used.

Example 1 Synthesis of an Alkyd Resin

A resin kettle equipped with heating jacket, stirrer, thermometer, addition funnel, and condensor was charged with the following materials (in the sequence of addition):

1.7 kg of tall oil fatty acid, 1.28 kg of pentaerythritol, 1.15 kg of benzoic acid, 1.0 kg of phthalic anhydride, 4 g of triphenyl phosphite, and 110 g of xylene isomer mixture. The charge was heated to 230° C. whereupon 30 g of zinc octoate solution (Zn 2-ethyl hexanoate, dissolved in ®Solvesso 150, mass fraction of solids 36.3%, mass fraction of Zn metal 8%) were added together with further 110 g of xylene isomer mixture. Condensation set in, and the reaction mixture was held at this temperature under stirring until about 427 g of water were distilled off, and the acid number was below the detection limit of 0.3 mg/g. Phthalic anhydride was then added in two portions of 350 g and then 12.5 g, and temperature was held for about one hour until 220 g of xylene isomers were distilled off. The viscosity of the reaction mixture was determined on a sample drawn as 145 mPa·s (measured at 23° C. on a solution in xylene with a mass fraction of solids of 50% and a shear gradient of 100 s$^{-1}$). The acid number was determined on that sample to be 7 mg/g. About 5.1 kg of a solvent-free alkyd resin were recovered. The following data were determined on the product:

| | |
|---|---|
| STAUDINGER-Index $J_g$ | 9.1 cm³/g (in chloroform solution) |
| Acid Number | 9.4 mg/g (mass of potassium hydroxide needed for neutralisation divided by mass of solid resin) |
| Dynamic Viscosity $\eta$ | 175 mPa · s (measured in a cone-plate rotational viscometer in xylene isomer mixture solution at 23° C. and a mass fraction of solids of 50%) |

Example 2 Modified Alkyd Resin Dispersion 1 kg of the alkyd resin of example 1 was charged to a resin kettle and heated under stirring (400 min⁻¹) to 100° C. A mixture of 38 g of n-butyl acrylate and 162 g of styrene was added, and the resulting mixture was cooled to 85° C. Then, a mixture of 6.4 g of potassium hydroxide and 6.4 g of water was added, and the resulting mixture was homogenised for fifteen minutes. 40 g of an anionic emulsifier which is a mixture of an alkylbenzene sulphonate and an alkoxyether carboxylate was then added and the resulting mixture was again homogenised for fifteen minutes whereafter a portion of 60 g of a nonionic emulsifier which is a mixture of alkoxylates having an average of between ten and thirty ethylene oxide units per molecule, of linear and branched aliphatic alcohols with an average of between ten and fifteen carbon atoms in the alcohol part was added and again homogenised for fifteen minutes. The homogeneous mixture was then stirred into 950 g of deionised water for about four hours. Three portions of 1 g each of ammonia peroxodisulphate were then added with a delay of thirty minutes between each addition, and the final mixture was held for two hours under stirring. A sample was drawn before each addition, and was analysed for its mass fraction of solids. After two hours of stirring, a further sample was drawn, and analysed for its mass fraction of solids, and then the reaction mixture was cooled to 75° C., 8.5 g of tert.-butyl hydroperoxide were added under stirring over ten minutes, and homogenised for further ten minutes whereafter a mixture of 8 g of a mixture of disodium 2-hydroxysulphinatoacetic acid, disodium 2-hydroxysulphonatoacetic acid, and disodiumsulphite as described in WO 1999/018067 A1, and 152 g of deionised water was added under stirring over fifteen minutes, and then the resulting mixture was held further two hours at 75° C. After cooling to ambient temperature (23° C.), 2.48 kg of an aqueous dispersion were obtained with the following data:

| | |
|---|---|
| mass fraction of solids $w_s$ | 52.5% |
| dynamic viscosity $\eta$ | 40 mPa · s (measured at 23° C. and a shear gradient of 10 s⁻¹) |
| pH | 5.0 |
| Mass average particle size $d_m$ | 205 nm |
| acid number | 13.7 mg/g |

The resulting dispersion can be used to provide surfaces of wood, metals, plastics, paper, and mineralic materials with a protective coating, preferably crosslinked by oxydative drying in the presence of siccatives.

Example 3 Modified Alkyd Resin Dispersion 1 kg of the alkyd resin of example 1 was charged to a resin kettle and heated under stirring (400 min⁻¹) to 100° C. A mixture of 38 g of n-butyl acrylate, 162 g of styrene and 6 g of pentaerythritol tetramercaptoacetate as chain transfer agent was added, and the resulting mixture was cooled to 85° C. Next, a mixture of 6.4 g of potassium hydroxide and 6.4 g of water was added, and the resulting mixture was homogenised for fifteen minutes. 40 g of an anionic emulsifier which is a mixture of an alkylbenzene sulphonate and an alkoxyether carboxylate was then added and the resulting mixture was again homogenised for fifteen minutes whereafter a portion of 60 g of a nonionic emulsifier which is a mixture of alkoxylates having an average of between ten and thirty ethylene oxide units per molecule, of linear and branched aliphatic alcohols with an average of between ten and fifteen carbon atoms in the alcohol part was added and again homogenised for fifteen minutes. The homogeneous mixture was then stirred into 1015.4 g of deionised water for about four hours. With a delay of thirty minutes between each addition, 2.5 g of tert.-butyl peroctoate, and 2.5 g of ammonium peroxodisulphate were added, and the final mixture was held for two more hours under stirring. A sample was drawn before each addition, and was analysed for its mass fraction of solids. After two hours of stirring, a further sample was drawn, and analysed for its mass fraction of solids, and then the reaction mixture was cooled to 75° C., 14 g of tert.-butyl hydroperoxide were added under stirring over ten minutes, and homogenised for further ten minutes whereafter 4 g of a mixture of disodium 2-hydroxysulphinatoacetic acid, disodium 2-hydroxysulphonatoacetic acid, and disodiumsulphite as described in WO 1999/018067 A1 were added under stirring over fifteen minutes, and then the resulting mixture was held further two hours at 75° C. After cooling to ambient temperature (23° C.), 2.39 kg of an aqueous dispersion were obtained with the following data:

| | |
|---|---|
| mass fraction of solids $w_s$ | 55.2% |
| dynamic viscosity $\eta$ | 66 mPa · s (measured at 23° C. and a shear gradient of 10 s⁻¹) |
| pH | 4.8 |
| Mass average particle size $d_m$ | 218 nm |
| acid number | 15.6 mg/g |

Example 4

A separate dispersion of the alkyd resin of example 1 was prepared in the following way:

900 g of the alkyd resin of example 1 were charged into a resin kettle equipped with thermometer, addition funnel, and stirrer, and heated to 95° C. at a stirrer speed of 400 min⁻¹. A solution of 5.4 g of potassium hydroxide in 5.4 g of water was added, and then, 30 g of an anionic emulsifier which is a mixture of an alkylbenzene sulphonate and an alkoxyether carboxylate was added and the resulting mixture was again homogenised for fifteen minutes whereafter a portion of 70 g of a nonionic emulsifier which is a mixture of alkoxylates having an average of between ten and thirty ethylene oxide units per molecule, of linear and branched aliphatic alcohols with an average of between ten and fifteen carbon atoms in the alcohol part was added and again homogenised for fifteen minutes. The homogeneous mixture was then stirred into 810.5 g of deionised water for about four hours. An alkyd resin dispersion with the following data was obtained:

| | |
|---|---|
| mass fraction of solids $w_s$ | 55.2% |
| pH | 5.3 |
| Mass average particle size $d_m$ | 261 nm |

Example 5

A separate styrene-acrylate dispersion was prepared in the following way:

Into a glass vessel equipped with thermometer, stirrer, and addition funnel, 7 kg of water were charged and heated to 82° C. In a separate vessel, an emulsifier solution was prepared by mixing in this sequence, 52.6 g of an alkyl diphenyloxide disulphonate emulsifier, 49.5 g of a dodecylbenzene sulphonate emulsifier, and 247.5 g of a fatty alcohol ethersulphonate emulsifier, into 6.3 kg of water. 5.1% of the mass of this emulsifier solution was added to the glass vessel, the remainder was used to emulsify the monomers therein, viz. 5 g of methacrylic acid, 7.995 kg of styrene, and 2 kg of butyl acrylate together with 400 g of pentaerythritol tetramercaptoacetate as chain transfer agent. 2.7% of the mass of this monomer emulsion was separated.

An initiator solution made by dissolving 22 g of ammonium peroxodisulphate in 78 g of water was added to the glass vessel, and then, the separated amount of 2.7% of the mass of the monomer emulsion was added to the glass vessel to start the polymerisation. After fifteen minutes, a sample was drawn to show that the polymerisation process had started correctly. The remainder of the monomer emulsion was the added over one and a half hour at 82° C., and the vessel was kept after the addition was finished for one further hour, a sample was drawn to show the extent of consumption of the monomers. The reaction mixture was cooled to 65° C., and 5 g of an aqueous solution of tert.-butyl hydroperoxide with a mass fraction of solute of 70% were then added in one portion, and the reaction mixture was stirred for further thirty minutes. A mixture of 5.5 g of sodium hydroxymethylsulfinate and 5 g of an aqueous ammonia solution having a mass fraction of 25% of dissolved ammonia was diluted with 300 g of water, this solution was added to the reaction mixture over thirty minutes. The reaction mixture was then cooled to 35° C., the pH was adjusted to approximately 8 by adding 1 g of an aqueous ammonia solution having a mass fraction of 25% of dissolved ammonia, and the viscosity was reduced to 1000 mPa·s by addition of 100 g of water 0.20 g of a biocide were the added, and the dispersion was filtered through a polyamide sieve having a mesh width of 80 μm. 25.586 kg of a dispersion having a mass fraction of solids of 41%, a dynamic viscosity measured at 23° C. and a shear gradient of 100 s$^{-1}$ of 22 mPa·s, a pH of 7 determined on an aqueous solution of 1 g of the dispersion in 9 g of water, an average particle size of 107 nm with a second order polydispersity index of 0.02, measured with a Zetasizer 1000 (Malvern Instruments) at 25° C., and evaluated according to the cumulant method. The minimum film forming temperature was determined to be 71° C., measured according to DIN 53 787.

Example 6

A further separate styrene-acrylate dispersion was prepared in the following way:

Into a glass vessel equipped with thermometer, stirrer, and addition funnel, 3.64 kg of water were charged and heated to 82° C. In a separate vessel, an emulsifier solution was prepared by mixing in this sequence, 52.6 g of an alkyl diphenyloxide disulphonate emulsifier, 49.5 g of a dodecylbenzene sulphonate emulsifier, and 247.5 g of a fatty alcohol ethersulphonate emulsifier, into 6.3 kg of water. 5.1% of the mass of this emulsifier solution was added to the glass vessel, the remainder was used to emulsify the monomers therein, viz., 5 g of methacrylic acid, 7.995 kg of styrene, and 2 kg of butyl acrylate. 2.7% of the mass of this monomer emulsion was separated.

An initiator solution made by dissolving 22 g of ammonium peroxodisulphate in 78 g of water was added to the glass vessel, and then, the separated amount of 2.7% of the mass of the monomer emulsion was added to the glass vessel to start the polymerisation. After fifteen minutes, a sample was drawn to show that the polymerisation process had started correctly. The remainder of the monomer emulsion was the added over one and a half hour at 82° C., and the vessel was kept after the addition was finished for one further hour, a sample was drawn to show the extent of consumption of the monomers. The reaction mixture was cooled to 65° C., and 5 g of an aqueous solution of tert.-butyl hydroperoxide with a mass fraction of solute of 70% were then added in one portion, and the reaction mixture was stirred for further thirty minutes. A mixture of 5.5 g of sodium hydroxymethylsulfinate and 1.5 g of an aqueous ammonia solution having a mass fraction of 25% of dissolved ammonia was diluted with 300 g of water, this solution was added to the reaction mixture over thirty minutes. The reaction mixture was then cooled to 35° C., the pH was adjusted to approximately 8 by adding 1 g of an aqueous ammonia solution having a mass fraction of 25% of dissolved ammonia, and the viscosity was reduced to 1000 mPa·s by addition of 100 g of water 0.20 g of a biocide were the added, and the dispersion was filtered through a polyamide sieve having a mesh width of 80 μm. 20.82 kg of a dispersion having a mass fraction of solids of 45%, a dynamic viscosity measured at 23° C. and a shear gradient of 100 s$^{-1}$ of 44 mPa·s, a pH of 7.4 determined on an aqueous solution of 1 g of the dispersion in 9 g of water, an average particle size of 123 nm with a second order polydispersity index of 0.02, measured with a Zetasizer 1000 (Malvern Instruments) at 25° C., and evaluated according to the cumulant method. The minimum film forming temperature was determined to be 71° C., measured according to DIN 53 787.

Example 7

A urethane modified alkyd resin was made according to the following procedure:

A resin kettle equipped with heating jacket, stirrer, thermometer, addition funnel, and condensor was charged with the following materials (in the sequence of addition): 2 kg of soy bean oil fatty acid, 1.16 kg of pentaerythritol, 1.0 kg of benzoic acid, 1.0 kg of phthalic anhydride, 5.3 g of triphenyl phosphite, and 110 g of xylene isomer mixture. The charge was heated to 230° C. whereupon 30 g of zinc octoate solution (Zn 2-ethyl hexanoate, dissolved in ®Solvesso 150, mass fraction of solids 36.3%, mass fraction of Zn metal 8%) were added together with further 110 g of xylene isomer mixture. Condensation set in, and the reaction mixture was held at this temperature under stirring until about 570 g of water were distilled off. The reaction was continued until the acid number reached 8 mg/g. 220 g of xylene isomers were then distilled off, and the temperature was reduced to 70° C. 255 g of styrene and 213 g of an isomer mixture of toluene diisocyanate were added. After one hour, all NCO groups had been consumed as verified on a sample drawn, so the reaction was stopped. About 5.1 kg of a styrene containing urethane modified alkyd resin were recovered. The following data were determined on the product:

| | |
|---|---|
| STAUDINGER-Index $J_g$ | 8.4 cm³/g (in chloroform solution) |
| Acid Number | 7.6 mg/g |

Example 8

A dispersion of a modified urethane alkyd resin was made by the following procedure:

1 kg of the urethane modified alkyd resin of example 7 was charged to a resin kettle and heated under stirring (400 min⁻¹) to 80° C. A mixture of 11 g of n-butyl acrylate and 44 g of styrene was added. A mixture of 1.3 g of potassium hydroxide and 1.3 g of water was added, and the resulting mixture was homogenised for fifteen minutes and afterwards cooled to 50° C. 44 g of an anionic emulsifier which is a mixture of an alkylbenzene sulphonate and an alkoxyether carboxylate was then added and the resulting mixture was again homogenised for fifteen minutes whereafter a portion of 44 g of a nonionic emulsifier which is a mixture of alkoxylates having an average of between ten and thirty ethylene oxide units per molecule, of linear and branched aliphatic alcohols with an average of between ten and fifteen carbon atoms in the alcohol part was added and again homogenised for fifteen minutes. To this homogeneous mixture 950 g of deionised water were added within about four hours. The temperature was set to 80° C. and 3.3 g of ammonia peroxodisulphate were added and the final mixture was held for two hours under stirring. The reaction mixture was cooled to 60° C., 3.3 g of tert.-butyl hydroperoxide were added under stirring over ten minutes, and homogenised for further ten minutes whereafter a mixture of 3.3 g of a mixture of disodium 2-hydroxysulphinatoacetic acid, disodium 2-hydroxysulphonatoacetic acid, and disodiumsulphite as described in WO 1999/018067 A1, and 97 g of deionised water was added under stirring over two hours, and then the resulting mixture was held further 30 minutes at 60° C. After cooling to ambient temperature (23° C.), 2.2 kg of an aqueous dispersion were obtained with the following data:

| | |
|---|---|
| mass fraction of solids $w_s$ | 57.1% |
| pH | 4.7 |
| Mass average particle size $d_m$ | 257 nm |

Example 9

White topcoats have been prepared from the modified alkyd resin dispersions, and for comparison, of simple mixtures of an alkyd resin with a styrene-acrylate dispersion. These topcoats were tested for gloss and gloss retention after storage. It was found that even when starting at the same high gloss level, the gloss retention of the "hybrid" formulations where the styrene-acrylate dispersion was prepared in the presence of the aqueously emulsified alkyd resin was much better than a simple resin blend with the same gross composition.

A pigment paste was prepared according to the following recipe:

To 1.74 kg of water were admixed, in this sequence, 0.36 kg of a polymeric, nonionic dispersing additive having pigment—compatible acid groups (®Disperbyk 190, Byk Chemie GmbH), 170 g of propylene glycol, 80 g of a silicon-free, fluoro-modified acrylic copolymer as levelling additive (®Additol VXW 6214, Allnex Austria GmbH), 190 g of a mineral oil-based defoamer (®Additol VXW 4973, Allnex Austria GmbH), 6.93 kg of a white rutile-type titanium dioxide pigment (®Kronos 2310, Kronos International Inc.), and 530 g of a polyurethane thickening agent (®Tafigel PUR 80, Münzing Chemie GmbH) to obtain 10 kg of pigment paste. The components were added in portions, in the sequence indicated, and homogenised for approximately thirty minutes in a ball mill.

Paint Preparation

To the binder dispersion, the following components were added under stirring:
- 0.5 g of a mineral oil based, silicon-free defoamer (®Additol VXW 6368)
- 37.0 g of the pigment paste as described supra
- 0.5 g of a combination siccative comprising Co, Zr and Li (®Additol VXW 6206), mixed with 0.5 g of water
- 1.0 g of a polyurethane thickening agent (®Tafigel PUR 80) (not used in paint 9.3)
- water added to achieve a total mass of 100 g The components were added in the sequence indicated, and stirring. The following table lists the mass of components that are not constant in the paints made here:

TABLE 1

Paint compositions

| | Paint | | | | |
|---|---|---|---|---|---|
| Component | 9.4 (comp.) | 9.6 (comp.) | 9.5 (comp.) | 9.3 | 9.2 |
| binder from example | Ex. 4 | Ex. 1 + Ex. 6* | Ex. 1 + Ex. 5** | Ex. 3 | Ex. 2 |
| mass of binder | 56.5 g | 58.75 g | 59.75 g | 58.75 g | 57.75 g |
| mass of water | 4.0 g | 1.75 g | 0.75 g | 2.75 g | 2.75 g |
| Paint Viscosity in mPa · s | 240 | 260 | 260 | 230 | 340 |

*mixture of 100 g of the alkyd resin of example 1 and 23.26 g of the copolymer of example 6
**mixture of 100 g of the alkyd resin of example 1 and 25.70 g of the copolymer of example 5

The paints were applied to glass panels in a wet film thickness of 150 μm and dried for ten days at ambient temperature (23° C.) and 30% of relative humidity. Gloss was recorded after drying, and after further storage of the painted glass panels at 23° C. and 50% of relative humidity for seven days. The following results were obtained:

TABLE 2

Gloss and Gloss Retention

| | Paint | | | | |
|---|---|---|---|---|---|
| | 9.4 (comp.) | 9.6 (comp.) | 9.5 (comp.) | 9.3 | 9.2 |
| 20° gloss after drying | 92 | 86 | 85 | 93 | 92 |
| 20° gloss after storage (7 d) | 88 | 75 | 73 | 90 | 89 |

It can be seen from these results that the gloss of a coating prepared from the alkyd resin modified with a styrene-acrylate copolymer by polymerisation of the copolymer in the presence of the emulsified alkyd resin (paints 9.3 and 9.2) is on par with the gloss of the unmodified alkyd resin (comparative paint 9.4), and the gloss retention of paints 9.3 and 9.2 is improved over that (comparative paint 9.4) prepared from the unmodified alkyd resin. Simple admixture of the same amount of styrene acrylate copolymer to an alkyd (comparative paints 9.6 and 9.5) leads to a loss of gloss compared to the unmodified alkyd (comparative paint 9.4), and the gloss retention is even lower than that of the unmodified alkyd (comparative paint 9.4). Polymerisation in the presence of an emulsified alkyd resin yields the best results. Similar results have been found when using the urethane alkyd resin as that of example 8 instead of the alkyd resin as that of example 1 used in this example 9.

The invention claimed is:

1. An aqueous dispersion of a modified alkyd resin comprising:
   water;
   an emulsifier S;
   a copolymer P having moieties derived from one or more of
      esters M1 of an olefinically unsaturated carboxylic acid M11 having at least one olefinic unsaturation and at least one acid group per molecule, with a linear, branched or cyclic aliphatic hydroxy-functional compound M12 having at least one hydroxyl group per molecule,
      esters M2 of an olefinically unsaturated hydroxy functional compound M22 having at least one olefinic unsaturation and at least one hydroxyl group per molecule, with linear, branched or cyclic aliphatic carboxylic acid M21 having no olefinic unsaturation and at least one acid group per molecule,
      an olefinically unsaturated carboxylic acid M11 having at least one olefinic unsaturation and at least one acid group per molecule,
      an olefinically unsaturated hydroxy functional compound M22 having at least one olefinic unsaturation and at least one hydroxyl group per molecule,
      an olefinically unsaturated compound M3 that has at least one olefinic unsaturation, selected from the group consisting of olefinically unsaturated alkylaromatic compounds M31, olefinically unsaturated aliphatic ethers M32, olefinically unsaturated aliphatic ketones M33, olefinically unsaturated aliphatic halogenides M34, and olefinically unsaturated aliphatic pseudohalogenides M35; and
   an alkyd resin A based on aliphatic linear or branched monocarboxylic acids A1 having from six to forty carbon atoms, aliphatic linear or branched or cyclic hydroxy-functional compounds A2 having at least two hydroxyl groups per molecule, aromatic or aliphatic linear, branched or cyclic acids A3 having at least two acid groups per molecule,
      wherein a mixture of at least two aliphatic linear or branched or cyclic hydroxy-functional compounds A2 is used, and at least one of these compounds present in this mixture, referred to as A21, has three or more hydroxyl groups per molecule,
      wherein in an amount of substance n(OH, A2) of hydroxyl groups present in the mixture of compounds A2, a fraction of at least 40% (0.4 mol/mol) is contributed by compounds A21 having three or more hydroxyl groups per molecule, and
      wherein the alkyd resin A has an acid number of at least 3 mg/g;
   wherein a ratio m(A)/m(P) of a mass m(A) of the alkyd resin A to a mass m(P) of the polymer P is at least 1 kg/0.5 kg, and
   wherein the emulsifier S is a mixture of a nonionic emulsifier $S_n$, and an anionic emulsifier $S_a$.

2. The aqueous dispersion of the modified alkyd resin of claim 1 wherein a ratio m(Sa)/m(Sn) of a mass m(Sa) of anionic emulsifier $S_a$ to a mass m(Sn) of nonionic emulsifier $S_n$ is from 75:25 to 25:75.

3. The aqueous dispersion of the modified alkyd resin of claim 1 wherein at least one of the monomers used in the copolymer P belongs to the group M3.

4. The aqueous dispersion of the modified alkyd resin claim 1 wherein at least one of the monomers used in the copolymer P belongs to the group M1.

5. The aqueous dispersion of the modified alkyd resin of claim 1 wherein at least one each of monomers of group M1 and of group M3 are used in the copolymer P.

6. The aqueous dispersion of the modified alkyd resin of claim 1 wherein the monomers of group M3 are selected from the group consisting of styrene, alpha-methylstyrene, para-methyl styrene, divinyl benzene, 1-vinylnaphthalene, 2-vinylnaphthalene, butylvinylether, vinylmethylketone, vinyl chloride, acrylonitrile and methacrylonitrile.

7. The aqueous dispersion of the modified alkyd resin of claim 1 wherein the compounds A2 have an average number of hydroxyl groups per molecule of at least 2.5.

8. The aqueous dispersion of the modified alkyd resin of claim 1 wherein a urethane alkyd resin A' is used which is made from reacting the alkyd resin A with a multifunctional isocyanate.

9. A water-borne coating composition made from the aqueous dispersion of the modified alkyd resin of claim 1 wherein the said dispersion is added to a pigment paste which comprises at least one pigment, and at least one additive selected from the group consisting of defoamers, wetting agents, levelling additives, biocides, and siccatives.

* * * * *